United States Patent
Vakhshouri

(10) Patent No.: US 12,153,471 B2
(45) Date of Patent: Nov. 26, 2024

(54) SYSTEM AND METHOD FOR DETECTING FAULTS IN FOLDABLE GLASS

(71) Applicant: Google LLC, Mountain View, CA (US)

(72) Inventor: Kiarash Vakhshouri, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/001,047

(22) PCT Filed: Aug. 2, 2021

(86) PCT No.: PCT/US2021/071082
§ 371 (c)(1),
(2) Date: Dec. 7, 2022

(87) PCT Pub. No.: WO2022/072961
PCT Pub. Date: Apr. 7, 2022

(65) Prior Publication Data
US 2023/0221767 A1 Jul. 13, 2023

Related U.S. Application Data

(60) Provisional application No. 63/198,122, filed on Sep. 30, 2020.

(51) Int. Cl.
| | | |
|---|---|---|
| *G06F 1/16* | (2006.01) | |
| *G01L 1/16* | (2006.01) | |
| *G06F 3/041* | (2006.01) | |

(52) U.S. Cl.
CPC .............. *G06F 1/1652* (2013.01); *G01L 1/16* (2013.01); *G06F 3/04144* (2019.05)

(58) Field of Classification Search
CPC .... G06F 1/1616; G06F 1/1626; G06F 1/1652; G06F 1/1675; G06F 3/04144; G01L 1/16
See application file for complete search history.

(56) References Cited

U.S. PATENT DOCUMENTS

| | | | |
|---|---|---|---|
| 2010/0079400 A1* | 4/2010 | Nissar | G06F 3/047 345/174 |
| 2010/0102403 A1* | 4/2010 | Celik-Butler | G01L 9/0042 438/50 |

(Continued)

FOREIGN PATENT DOCUMENTS

| | | |
|---|---|---|
| WO | 2017058516 A1 | 4/2017 |
| WO | 2019050257 A1 | 3/2019 |
| WO | 2020047076 A1 | 3/2020 |

OTHER PUBLICATIONS

International Search Report and Written Opinion of International Application No. PCT/US2021/071082 dated Nov. 11, 2021, 8 pp.

(Continued)

*Primary Examiner* — Ryan A Lubit
(74) *Attorney, Agent, or Firm* — Shumaker & Sieffert, P.A.

(57) ABSTRACT

A foldable device includes a housing and a foldable display device coupled to the housing. The foldable display device includes a foldable display layer, a foldable glass layer on a first side of the foldable display layer, and a sensing device on a second side of the foldable display layer. The sensing device includes a strain gauge layer. The strain gauge layer includes an array of resistors arranged on a piezoresistive substrate. Changes in resistance levels measured by the array of resistors are used to detect faults such as scratches, punctures, cracks and the like in the foldable glass layer. The foldable device may output an alert in response to detection of a fault in the foldable glass layer.

9 Claims, 15 Drawing Sheets

(56) References Cited

U.S. PATENT DOCUMENTS

| | | | |
|---|---|---|---|
| 2012/0242592 A1* | 9/2012 | Rothkopf | G06F 3/041 |
| | | | 345/173 |
| 2013/0083496 A1* | 4/2013 | Franklin | G06F 3/0412 |
| | | | 361/752 |
| 2013/0172068 A1* | 7/2013 | Zhou | G06Q 30/02 |
| | | | 463/31 |
| 2017/0293367 A1 | 10/2017 | Arai | |
| 2018/0173028 A1* | 6/2018 | Koppal | G09G 3/3648 |
| 2018/0292933 A1* | 10/2018 | Hu | G01L 1/2262 |
| 2019/0242238 A1* | 8/2019 | Yao | E21B 47/013 |
| 2020/0073446 A1* | 3/2020 | Wu | G06V 40/13 |
| 2020/0073495 A1* | 3/2020 | Bok | G06F 1/1643 |
| 2020/0117305 A1* | 4/2020 | Kim | G06F 3/0412 |
| 2020/0313111 A1* | 10/2020 | Kim | G09F 9/335 |
| 2021/0225961 A1* | 7/2021 | Sun | G09G 3/035 |

OTHER PUBLICATIONS

Mertens, "Tianma demonstrates its latest foldable, flexible and rigid AMOLEDs at SID 2018", OLED-info, Retrieved from: https://www.oled-info.com/tianma-demonstrates-its-latest-foldable-flexible-and-rigid-amoleds-SID-2018, Jun. 6, 2018, 3 pp.

* cited by examiner

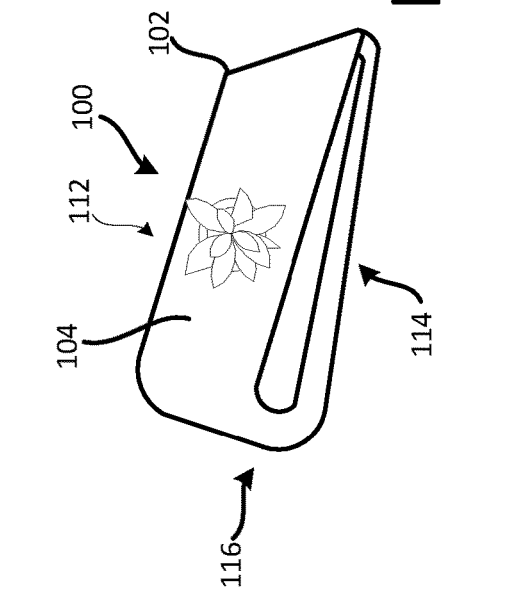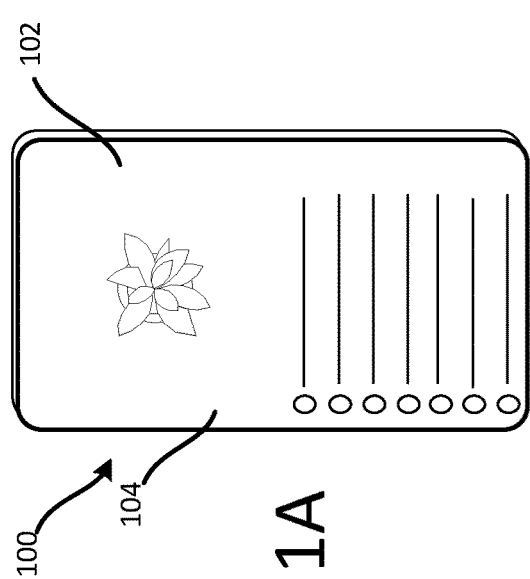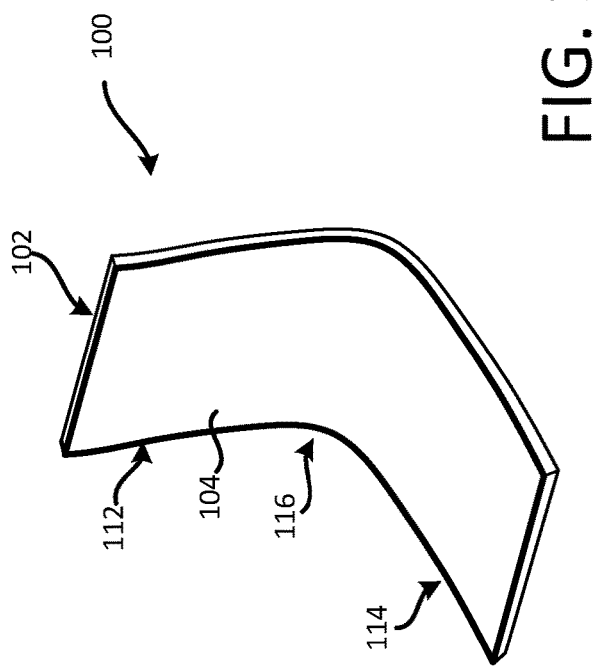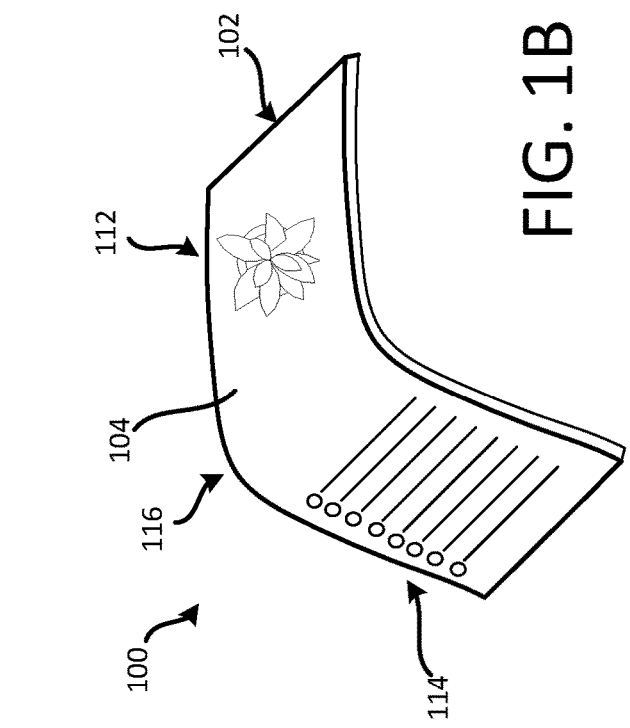

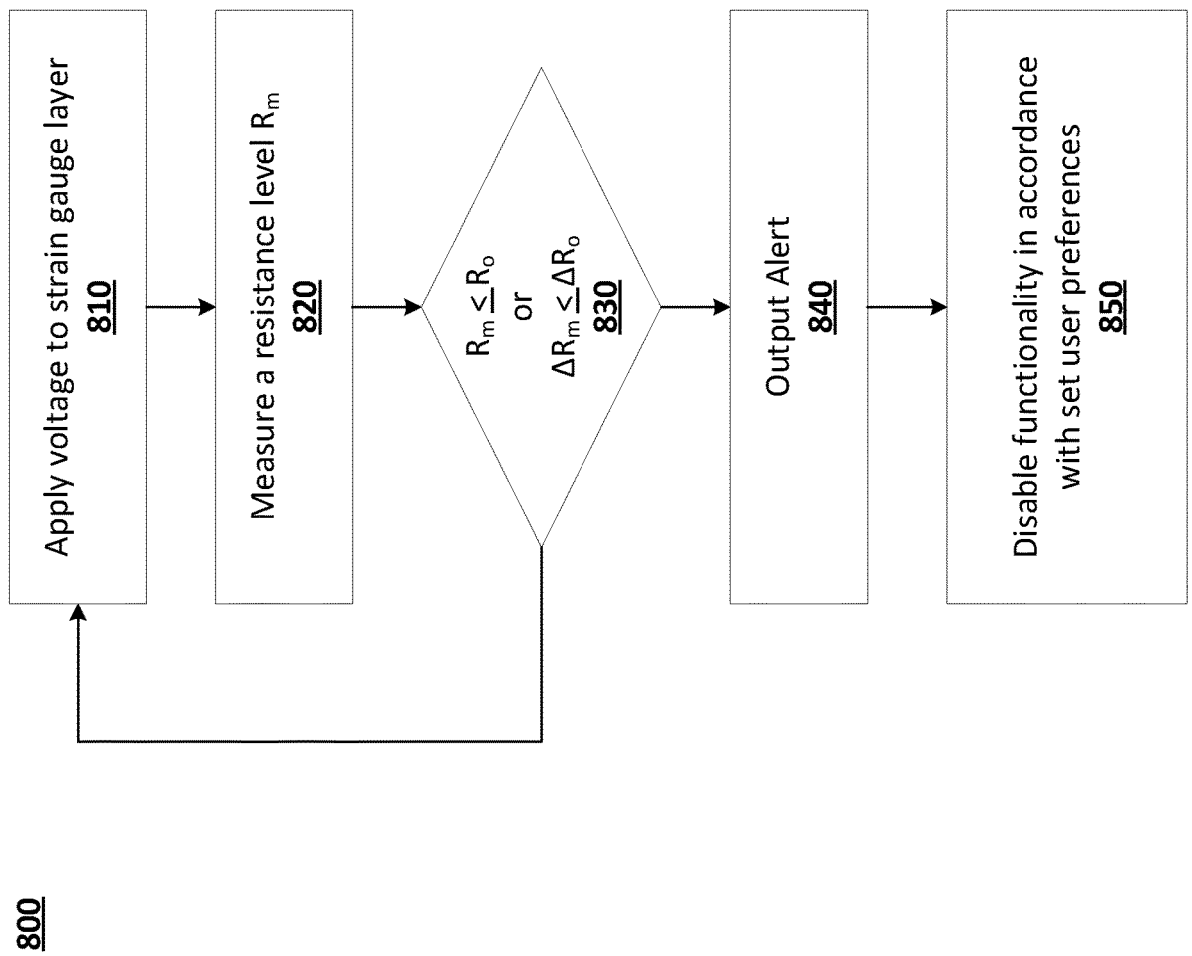

SYSTEM AND METHOD FOR DETECTING FAULTS IN FOLDABLE GLASS

CROSS-REFERENCE TO RELATED APPLICATION

This application is a continuation of, and claims priority to, U.S. Application No. 63/198,122, filed on Sep. 30, 2020, entitled "SYSTEM AND METHOD FOR DETECTING FAULTS IN FOLDABLE GLASS," the entirety of which is incorporated by reference herein.

TECHNICAL FIELD

This description relates, in general, to foldable devices, and in particular, to detection of faults in a foldable glass layer of a foldable device.

BACKGROUND

Modern computing devices often attempt to achieve a balance between portability and functionality. User desire for a device that provides for a rich display of information on a single larger surface often conflict with the desire for a device that is small enough to be easily carried. A device with a flexible, or foldable, display may have a relatively small form factor in a folded configuration, and yet provide a relatively large display area in an unfolded configuration. A foldable device with a foldable display including a cover layer made of a plastic-based material may be subject to deformation in a portion of the plastic cover layer corresponding to a bendable section of the foldable display. The deformation of the plastic-based material may be manifested in, for example, creasing, discontinuities, loss of planarity and the like in the bendable section. A cover layer made of a plastic-based material may be subject to pocking, thus further degrading the user interface surface of the foldable display. Degradation of the plastic cover layer in this manner may degrade the viewing of content in the degraded area. Degradation of the plastic cover layer in this manner may adversely impact the detection of inputs, for example, touch inputs in the degraded area. A foldable device with a foldable display including a cover layer made of a glass-based material is considerably less susceptible to this type of deformation in the bendable section of the foldable display. Thus, a cover layer made of a glass-based material may provide a relatively smooth user interface surface, including at the bendable section of the foldable display.

SUMMARY

In one general aspect, a foldable device includes a housing; and a foldable display device coupled to the housing. In some implementations, the foldable display device includes a foldable display layer having a bendable section; a foldable glass layer on a first side of the display layer, the foldable glass layer defining a display surface of the foldable device; and a sensing device including a strain gauge layer on a second side of the display layer opposite the first side and configured to monitor a condition of the foldable glass layer. A position of the strain gauge layer on the second side of the display layer may correspond to a position of the bendable section of the display layer.

In some implementations, the strain gauge layer includes an array of sensing elements arranged on a substrate, the array of sensing elements being configured to measure an electrical property at the strain gauge layer in response to a detected bending of the foldable device. In some implementations, the sensing device is configured to receive a measured electrical property level measured by the array of resistors of the strain gauge layer; and to detect a triggering condition based on the measured electrical property level. In some implementations, the sensing device is configured to detect a fault in the foldable glass layer in response to the detected triggering condition. In some implementations, the sensing device is configured to compare the measured electrical property level to a previously set threshold electrical property level; and to detect a fault in the foldable glass layer in response to a determination that the measured electrical property level is less than or equal to the set threshold electrical property level.

In some implementations, the sensing device is configured to compare the measured electrical property to a previously set threshold electrical property level; and to detect a fault in the foldable glass layer in response to a determination that the measured electrical property level meets a predetermined criterion. The predetermined criterion may be that the measured electrical property is less than or equal to the set threshold electrical property level.

In some implementations, the sensing device is configured to compare a currently received measured electrical property level to a previously received measured electrical property level; calculate a change in measured electrical property level based on the comparison; and detect a fault in the foldable glass layer in response to a determination that the change in measured electrical property level is less than or equal to a set threshold change in electrical property level.

In some implementations, the sensing device is configured to compare the measured electrical property to a previously set threshold electrical property level; calculate a change in measured electrical property level based on the comparison; and detect a fault in the foldable glass layer in response to a determination that the change in measured electrical property level meets a predetermined criterion. The predetermined criterion may be that the change in measured electrical property is less than or equal to a set threshold change in electrical property level.

In some implementations, the foldable device is configured to output an alert in response to the detected triggering condition.

In some implementations, the strain gauge layer includes an array of resistors arranged on a piezoresistive substrate, including a plurality of first metal lines arranged in a first direction on the substrate; a plurality of second metal lines arranged in a second direction on the substrate, the second direction being different from the first direction; and a plurality of contacts on the plurality of first metal lines and the plurality of second metal lines.

In some implementations, each sensing element of the array of sensing elements extends between a respective contact of the plurality of contacts on one of the plurality of first metal lines and a respective contact of the plurality of contacts on one of the plurality of second metal lines. In some implementations, the array of sensing elements includes an array of resistors arranged on a piezoresistive substrate, the array of resistors being arranged to measure resistance at the strain gauge layer. In some implementations, the strain gauge layer includes a capacitive strain gauge or a thin film transistor based strain gauge.

In another general aspect, a method of detecting a fault in a foldable glass layer of a foldable display device includes applying, by a driver of the foldable display device, an input to an array of sensing elements arranged on a substrate of a strain gauge layer included in a sensing device positioned on a first side of a display layer of the foldable display device; measuring, by the array of sensing elements, an electrical property level; and detecting, by the sensing device, a fault in the foldable glass layer based on the measured electrical property level, the foldable glass layer being positioned on a second side of the display layer opposite the first side.

In some implementations, the measuring, by the array of sensing elements, of the electrical property level includes measuring the electrical property level during a bending cycle of the foldable display device, the strain gauge layer being located at a position corresponding to a bendable section of the foldable display device. In some implementations, the detecting, by the sensing device, of the fault in the foldable glass layer includes receiving the measured electrical property level measured by the array of resistors of the strain gauge layer; comparing the measured electrical property level to a previously set threshold electrical property level; and detecting the fault in the foldable glass layer in response to a determination that the measured electrical property level is less than or equal to the set threshold electrical property level. In some implementations, the detecting, by the sensing device, of the fault in the foldable glass layer includes comparing a currently received measured electrical property level to a previously received measured electrical property level; calculating a change in electrical property resistance level based on the comparison; and detecting the fault in the foldable glass layer in response to a determination that the change in measured electrical property level is less than or equal to a set threshold change in electrical property level.

In some implementations, the array of sensing element arranged on the substrate of strain gauge layer comprises an array of resistors arranged on a piezoresistive substrate, and the method further includes applying an input to the array of sensing elements comprises applying a voltage to the array of resistors, measuring the electrical property level comprises measuring the resistance level; and detecting the fault is based on the measured resistance level. In some implementations, the method includes outputting, by the foldable display device, an alert in response to the detected fault in the foldable glass layer.

BRIEF DESCRIPTION OF THE DRAWINGS

FIGS. 1A-1D illustrate an example foldable device including an example foldable display.

FIG. 8 is a flowchart of a method, in accordance with implementations described herein.

DETAILED DESCRIPTION

Figure 2A:
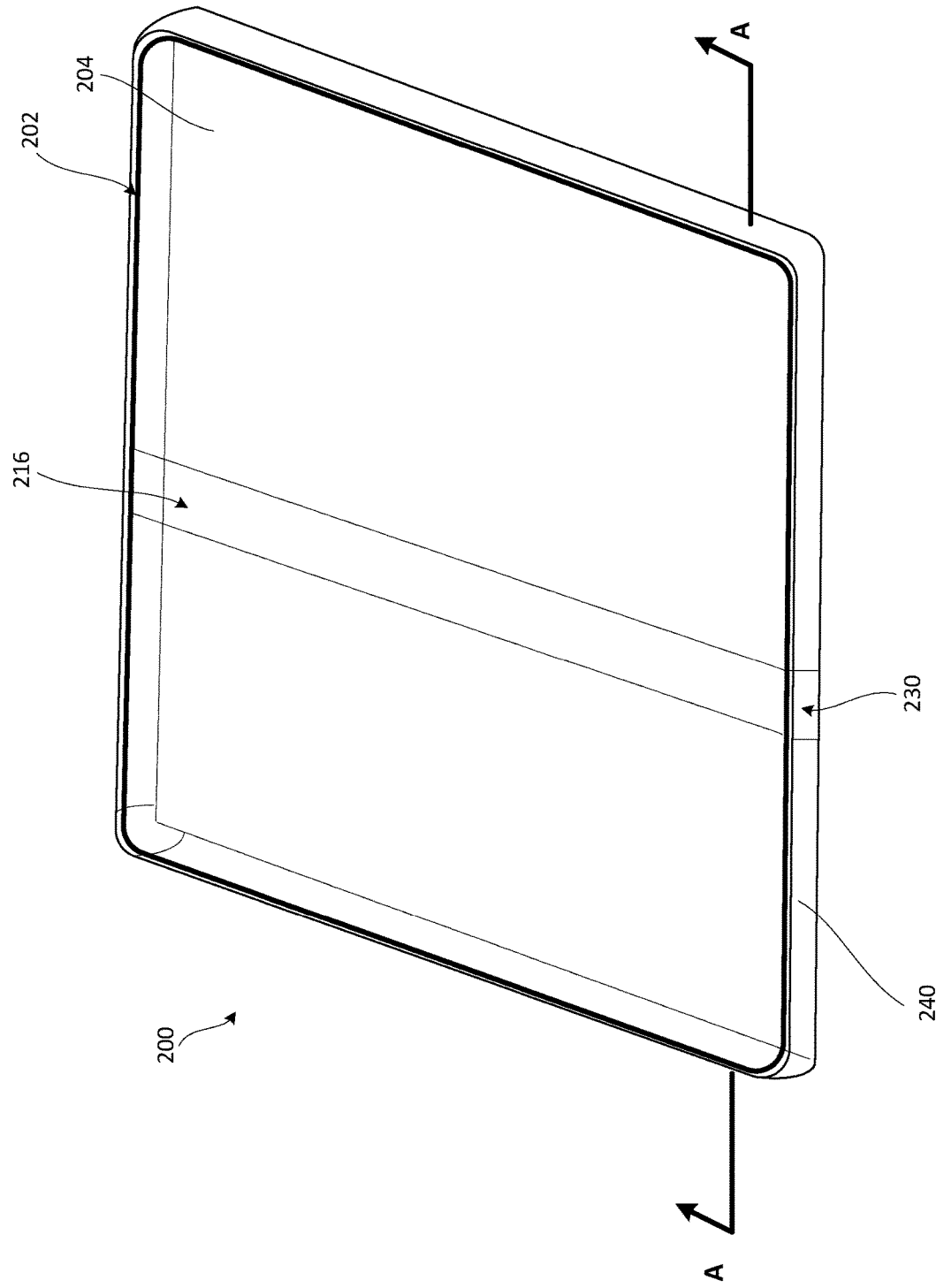
FIGS. 2A and 2B are perspective views of an example foldable device, in accordance with implementations described herein.

A foldable device, in accordance with implementations as described herein, includes a foldable layer having a foldable glass layer. In some implementations, the foldable layer is a foldable display, with the foldable glass layer positioned at a user interface surface of the foldable display. In some implementations, the foldable device includes a sensing device that detects strain in the foldable glass layer, particularly in a section of the foldable glass layer corresponding to a bendable section of the foldable display. In some implementations, the sensing device includes one or more strain gauges, or strain gauge layers, that measure strain in the foldable glass layer. In some implementations, the measured strain provides an indication of a fault in the foldable glass layer such as, for example, pocking, scratching, cracking and the like.

FIGS. 1A-1D illustrate an example foldable device 100 such as, for example, a foldable computing device 100 that includes a foldable layer 102 such as, for example, a foldable display 102. In particular, FIG. 1A shows a front view of the example device 100 in an unfolded configuration. FIGS. 1B and 1D show perspective views of the example device 100 in different partially folded configurations. FIG. 1C shows a side view of the example device 100 in a fully folded configuration. In the views shown in FIGS. 1B and 1C, the foldable layer 102 is a foldable display 102 that is mounted so that a display surface 104 faces outward in the folded configuration of the device 100. In the view shown in FIG. 1D, the foldable layer 102 is a foldable display 102 that is mounted so that a display surface 104 faces inward in the folded configuration of the device 100. The foldable display 102 can include a variety of different types of flexible displays, including, for example, a flexible organic light emitting diode (OLED) layer, a thin film transistor (TFT) layer, and the like.

In some implementations, the example foldable display 102 includes a first relatively flat, relatively rigid or semi-rigid section 112, a second relatively flat, relatively rigid or semi-rigid section 114, and a foldable portion or bendable section 116. In some implementations, the foldable display 102 includes more than two flat, rigid sections 112, 114 and/or more than one bendable section 116. In some implementations, the foldable display 102 includes zero, or only one, flat rigid sections 112, 114. For example, when a foldable display 102 includes zero flat rigid sections, the foldable display 102 may be substantially continuously bendable, and may be rolled up, as in a scroll. The example foldable display 102 shown in FIGS. 1A-1D includes an example bendable section 116 that allows the foldable display 102 to bend about an axis. In some implementations, the foldable display 102 includes more than one bendable section 116 that allows the flexible display 102 to bend about more than one axis. In some implementations, the bendable section 116 allows the foldable display 102 to bend, or fold, for example, in an arcuate shape, that has a bending radius, and/or radius of curvature.

Components of the foldable display 102 in the area of the bendable section 116 may be subjected to tensile forces and/or compressive forces as the foldable device 100 moves between the unfolded configuration and the folded configuration. For example, in an arrangement in which the foldable display 102 includes a foldable glass layer, for example, at the display surface 104 of the foldable display 102, portions of the foldable glass layer in the area of the bendable section 116 of the foldable display 102 are subjected to tensile and/or compressive forces over time, as the foldable display 102 is cycled between the unfolded and folded configurations. Exposure to these types of tensile forces and/or compressive forces may degrade the integrity of the material of the foldable glass layer, particularly in a portion of the foldable glass layer corresponding to the bendable section 116 of the foldable display 102. Degradation of the material of the foldable glass layer may lead to failure of the foldable glass layer. Degradation of the foldable glass layer may cause a fault that is already present in the foldable glass layer (due to, for example, a pock or scratch due to contact or impact with an external object and the like) to propagate quickly to failure.

Degradation of the foldable glass layer may include faults such as, for example, cracking, scratches, or punctures, which can lead to cracking, and the like. This type of degradation of the foldable glass layer may lead to the release of glass fragments, or shards, particularly in areas of the foldable glass layer that experience folding or bending. In particular, bending/folding will cause release of glass fragments or shards from cracks in the glass layer being folded/bent as the foldable glass layer flexes. Release of glass fragments, or shards, from an external facing side of the foldable glass cover layer may pose a hazard to the user for example, as the user runs a finger over the surface of the foldable glass layer. Glass fragments, or shards, released from an internal facing side of the foldable glass layer may infiltrate elements of the foldable display, causing damage to components of the foldable display and/or compromising the functionality of the foldable display. Either of these situations could render the foldable display and/or the foldable device unusable, thus adversely impacting device reliability and user satisfaction. A system and method for monitoring the condition of the foldable glass layer, and for alerting the user to the condition of the foldable glass layer, may provide for monitoring and replacement of the foldable glass layer before the functionality of the foldable device is adversely impacted.

Accordingly, a foldable device including a foldable display device, in accordance with implementations described herein, includes a sensing device that senses a condition of the foldable glass layer. In some implementations, the sensing device includes at least one strain gauge, or at least one strain gauge layer. In some implementations, the at least one strain gauge, or strain gauge layer, detects the presence of a fault or discontinuity, such as, for example, a crack or fracture, in the foldable glass layer based on a detected change in resistivity measured by the at least one strain gauge/strain gauge layer.

Figure 2B:
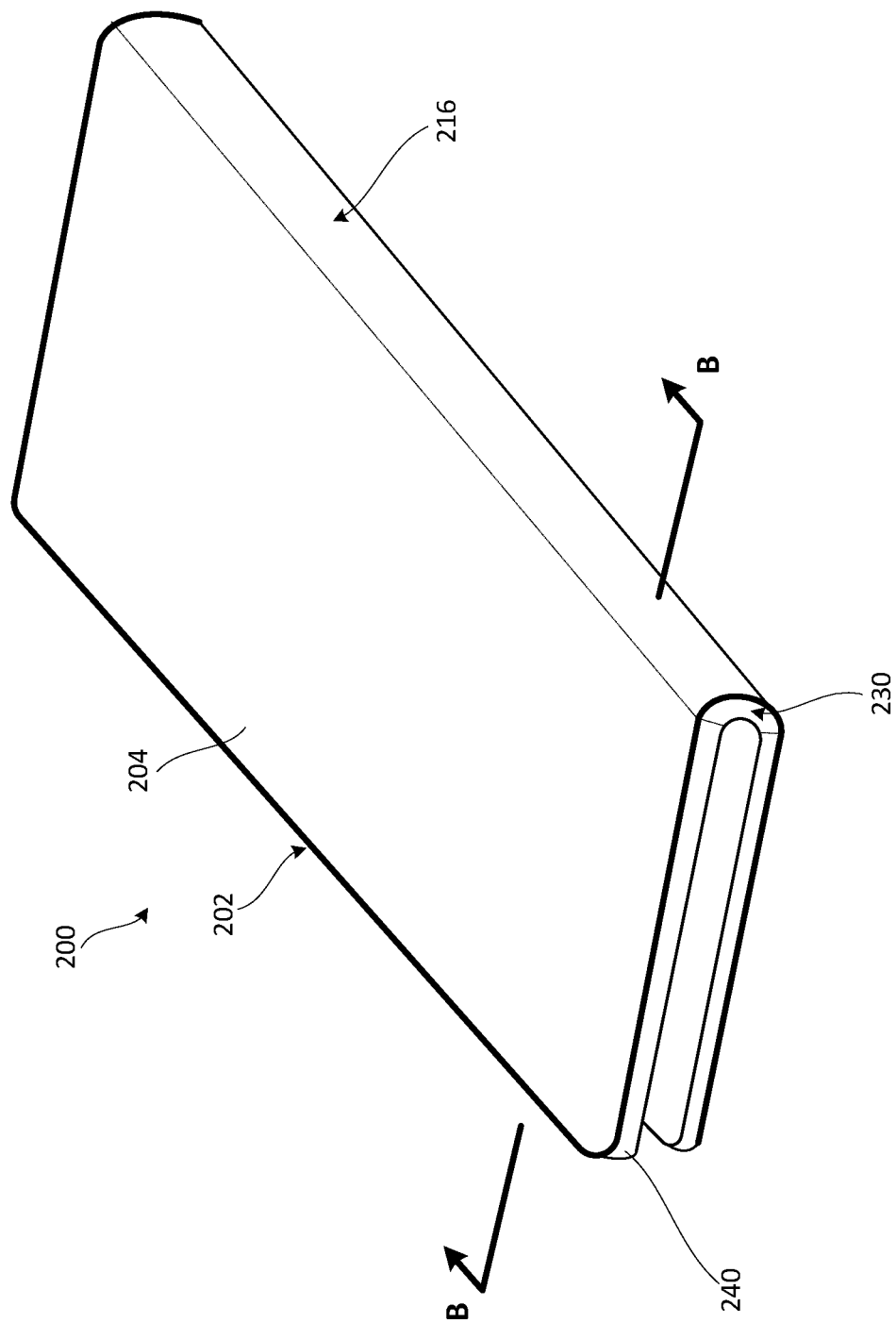

FIGS. 2A and 2B are perspective views of an example foldable computing device 200. In the example shown in FIGS. 2A and 2B, a display surface 204 of the computing device 200 faces outward in the folded configuration shown in FIG. 2B, simply for purposes of discussion and illustration. In addition, the principles described herein are also applicable to foldable devices in which the display surface faces inward in the folded configuration and to other foldable devices including a foldable glass layer. A foldable computing device 200 is shown in FIGS. 2A and 2B, simply for purposes of discussion and illustration. However, the principles described herein may be applied to other foldable devices including a foldable glass layer.

The example computing device 200 includes a housing 240 in which various components of the computing device 200 are received. A foldable display 202 is mounted on the housing 240, with an outward facing portion of the foldable display 202 defining the display surface 204, both in the unfolded configuration shown in FIG. 2A, and in the folded configuration shown in FIG. 2B. In some implementations, the computing device 200 includes a hinge mechanism 230 that supports and guides the folding and unfolding of the computing device 200. In the example shown in FIGS. 2A and 2B, the hinge mechanism 230 is received in a portion of the housing 240 corresponding to a bendable section 216 of the foldable display 202.

In the example shown in FIGS. 2A and 2B, the bendable section 216 of the foldable display 202 is positioned corresponding to a central portion of the computing device 200, simply for purposes of discussion and illustration. In some implementations, the bendable section 216 is located at positions other than the central portion of the device 200, and/or the foldable display 202 includes more bendable sections. In some implementations, the foldable display 202 is continuously bendable. In the example foldable display 202 shown in FIGS. 2A and 2B, the bendable section 216 allows the foldable display 202 to bend about an axis. In the example shown in FIGS. 2A and 2B, a foldable glass layer coupled to the foldable display 202 and defining the display surface 204 bends or folds together with the foldable display 202.

Figure 3A:
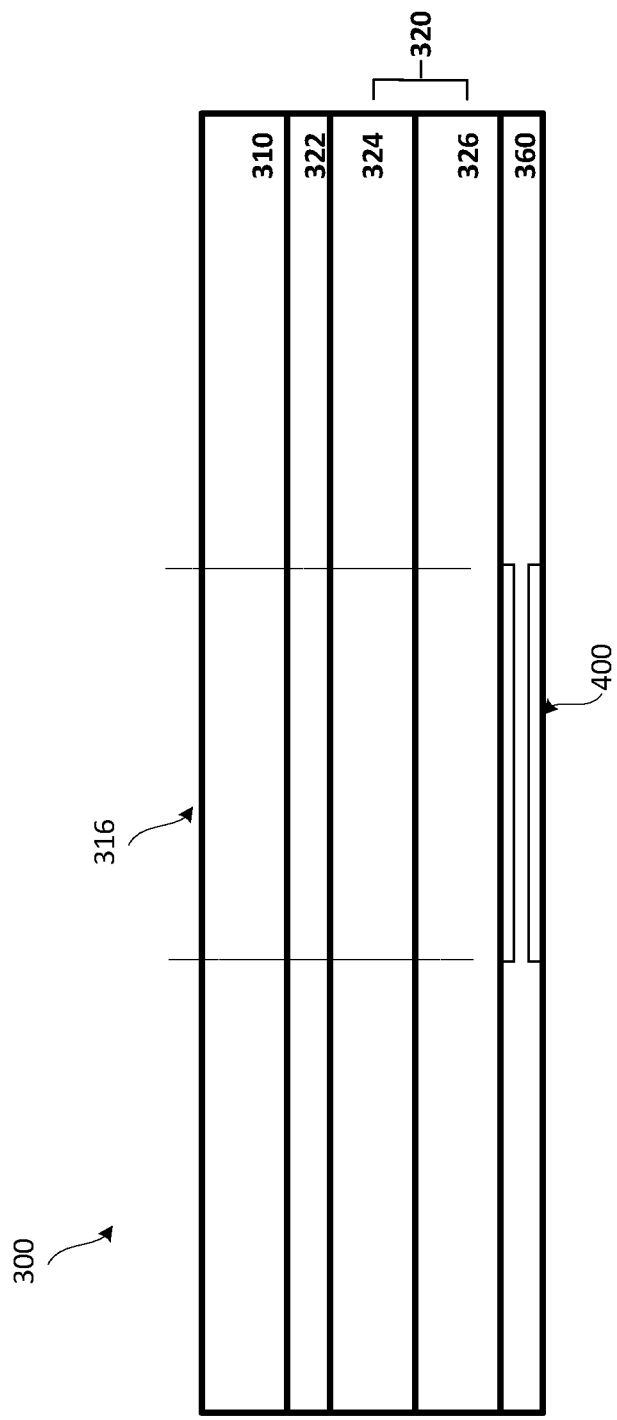
FIGS. 3A-3B are schematic side views of an example foldable device including an example foldable glass layer, in accordance with implementations described herein.
Figure 3B:
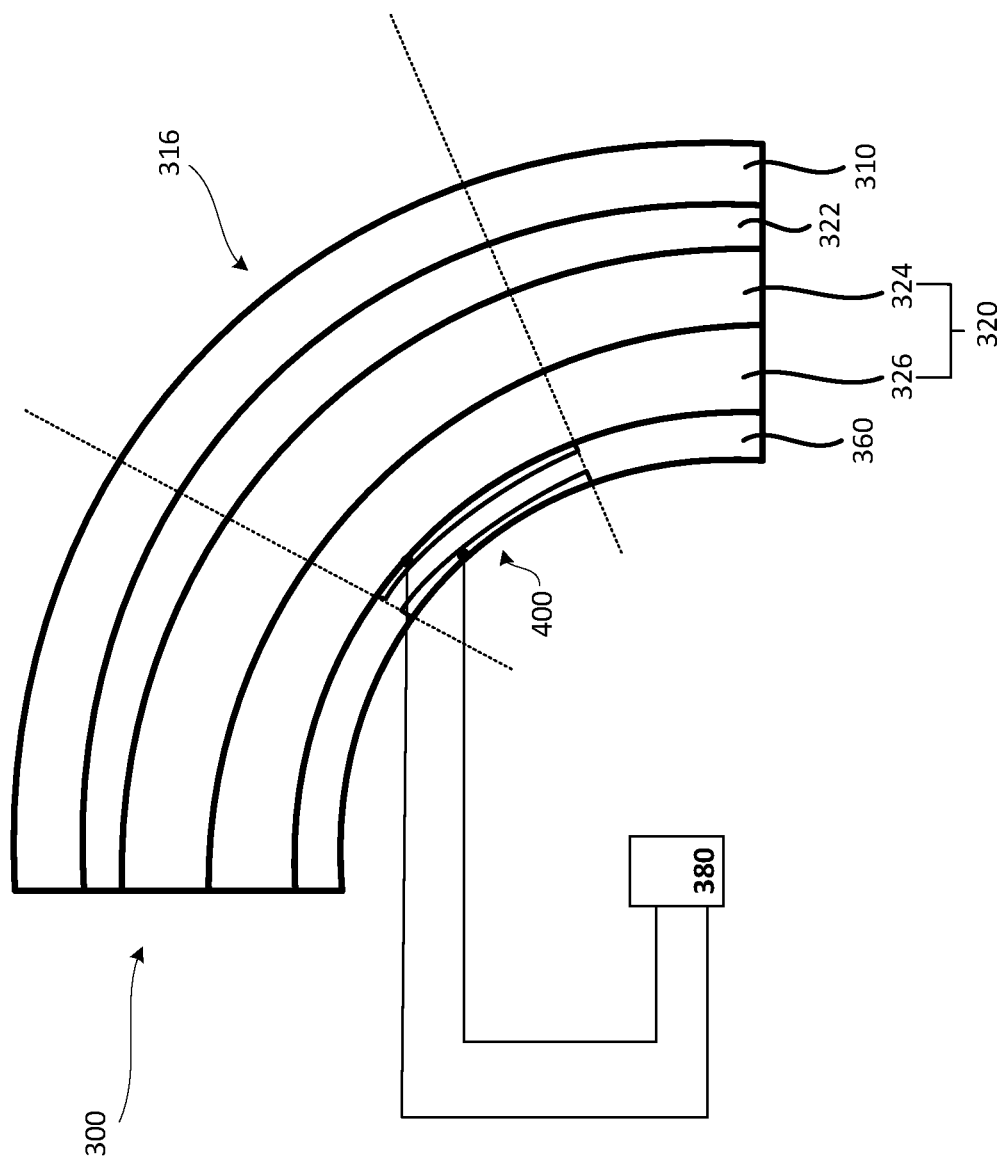

FIGS. 3A and 3B are schematic side views of a portion of an example foldable device 300 including an example foldable glass layer 310 and an example sensing device 360, in accordance with implementations described herein. The foldable device 300 in this example is a foldable display device 300 that can be installed in a computing device such as, for example, the example computing device 200 shown in FIGS. 2A and 2B, simply for purposes of discussion and illustration. The principles described herein may be applied to other types of foldable devices including a foldable glass layer. The view shown in FIG. 3A may be representative of a partial cross-sectional view taken along line A-A of FIG. 2A, with the example foldable display device 300 in the unfolded configuration. The view shown in FIG. 3B may be representative of a partial cross-sectional view taken along line B-B of FIG. 2B, at a bendable section 316 of the foldable display device 300 in the folded configuration.

In the example arrangement shown in FIGS. 3A and 3B, the example display device 300 includes a display layer 320. In some implementations, the display layer 320 includes multiple layers including, for example, a polarizer 324, an image generating layer 326 such as a flexible OLED layer, a flexible TFT layer, and/or other such types of flexible layers capable of generating images to be displayed by the foldable display device 300. In some implementations, other components and/or arrangements of components are included in the display layer 320. In this example, a foldable glass layer 310 is positioned at a first side of the display layer 320. In some implementations, the foldable glass layer 310 is coupled to the display layer 320 by an adhesive layer 322 such as, for example, an optically clear adhesive (OCA). In the example shown in FIGS. 3A and 3B, a sensing device 360 is positioned at a second side of the display layer 320, opposite the first side. In this arrangement, the foldable glass layer 310 defines a user interface surface of the foldable device in which the foldable display device 300 is installed (such as, for example, the computing device 200 shown in FIGS. 2A and 2B). For example, with the foldable display device 300 installed in the computing device 200 shown in FIGS. 2A and 2B, the foldable glass layer 310 defines a user interface surface of the display surface 204 of the computing device 200 in the unfolded and folded configurations. In some implementations, the user interface surface that is defined by the foldable glass layer 310 can include a thin protective (e.g., plastic) film.

In some implementations, the sensing device 360 includes a strain gauge layer 400, to be described below with respect to FIGS. 4A-4C. In some implementations, the strain gauge layer 400 is sized and positioned to correspond to a portion of the foldable display device 300/foldable display layer 320 and a corresponding portion of the foldable glass layer 310. For example, in some implementations, the strain gauge layer 400 is sized and positioned to correspond to the bendable section 316 of the foldable display device 300 and a corresponding portion of the foldable glass layer 310. In some implementations, the strain gauge layer 400 is sized and positioned to correspond to substantially the entire bendable section 316 of the foldable display device 300 and the corresponding portion of the foldable glass layer 310. In some implementations, the strain gauge layer 400 is sized and positioned to correspond to a portion of the bendable section 316 of the foldable display device 300 and the corresponding portion of the foldable glass layer 310. In some implementations, the sensing device 360 including the strain gauge layer 400 is coupled to the foldable glass layer 310, with the display layer 320 positioned therebetween. In some implementations, mechanical connection or coupling is through the use of, for example, pressure sensitive adhesives, liquid adhesives, and the like (not shown in FIGS. 3A and 3B). Therefore, degradation such as, for example, faults in the form of pocking, scratches, cracks and the like in the foldable glass layer 310 may be detected based on an electrical property such as, for example, resistance, or another electrical property measured by the strain gauge layer 400, because of the coupling of the glass layer 310 to the sensing device 360. In particular, this type of degradation can be detected based on changes in the measured electrical property.

Figure 4A:
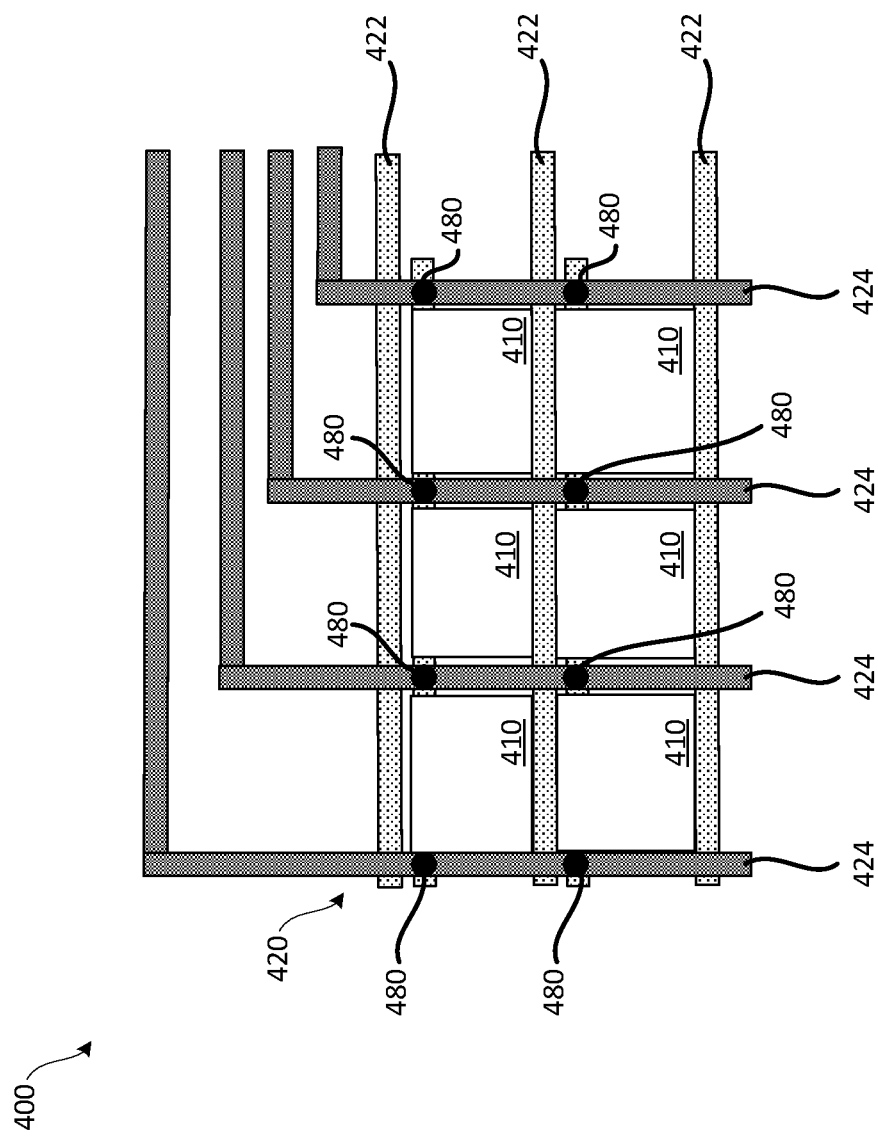
FIG. 4A is a plan view.
Figure 4B:
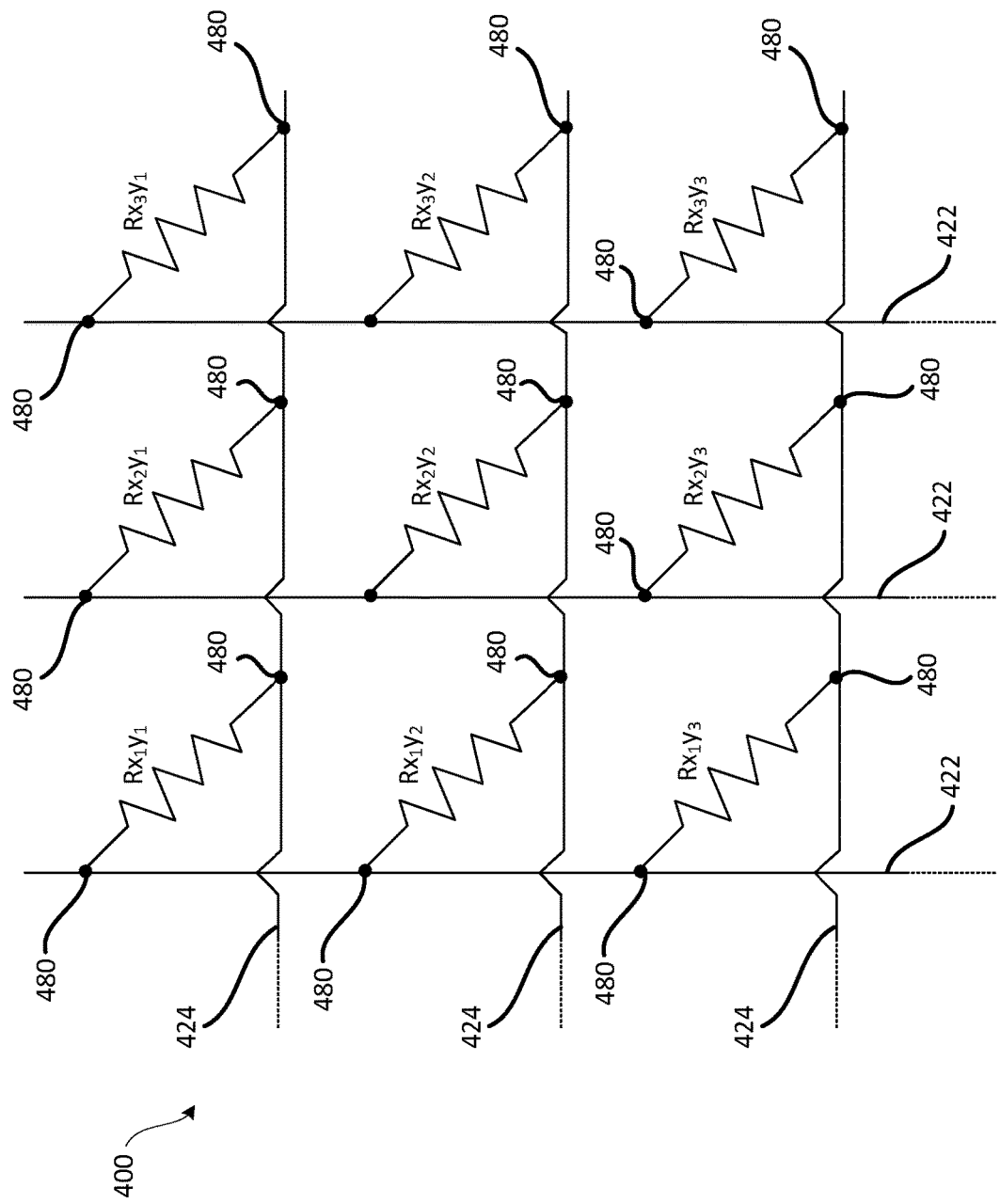
FIG. 4B is a schematic view.
Figure 4C:
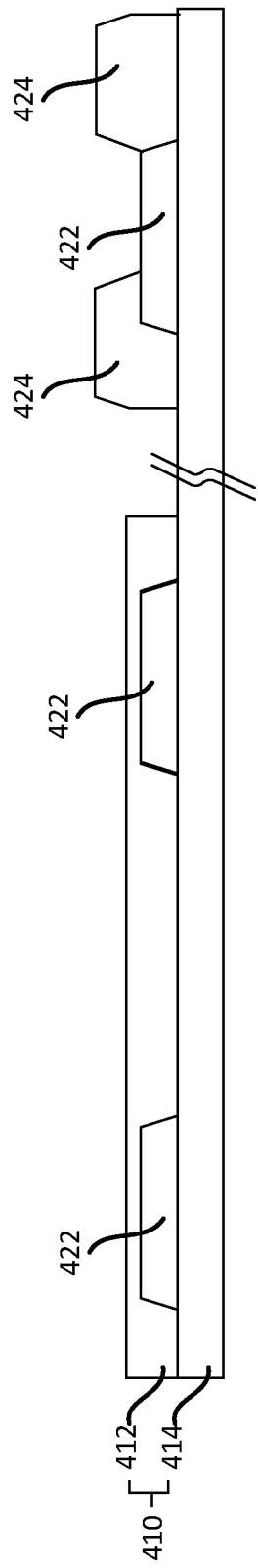
FIG. 4C is a side view of an example strain gauge layer of the example foldable display device shown in FIGS. 3A and 3B, in accordance with implementations described herein.

FIG. 4A is a plan view of a portion of the example strain gauge layer 400 of the sensing device 360. In some implementations, the strain gauge layer includes an array of sensing elements 420 arranged on a base layer 410. In the example shown in FIGS. 4A-4C, the strain gauge layer 400 includes an array of resistors 420 defining an electrical pattern, simply for purposes of discussion and illustration. The array of sensing elements can include other types of sensing elements. FIG. 4B is a schematic diagram of a portion of the array of sensing elements 420 included in the strain gauge layer 400, including example resistors $Rx_1y_1$ through $Rx_ny_n$ between pairs of contacts 480. FIG. 4C is a side view of a portion of the example strain gauge layer 400. As noted above, the example strain gauge layer 400 shown in FIGS. 4A-4C employs a resistive based strain gauge, for purposes of discussion and illustration. A resistor is one example of a sensing element. In the example arrangement in which the array of sensing elements 420 is an array of resistors, the electrical property measured by the array of sensing elements is resistance. Arrays of sensing elements comprised of other types of components will measure other electrical properties. Other types of strain gauges such as, for example capacitive strain gauges or TFT based strain gauges, may also be employed. In some implementations, the base layer 410 includes a piezoresistive material 412 such as, for example, a microcrystalline silicon material 412 on a polyimide (PI) substrate 414. In some implementations, the mesh of resistors 420 is defined by one or more first lines 422 extending in a first direction, and one or more second lines 424 extending in a second direction. In some implementations, the second direction is substantially orthogonal to the first direction. In some implementations, the array of resistors 420 includes a plurality of first lines 422 and a plurality of second lines 424 arranged in a mesh or a grid. In some implementations, the one or more first lines 422 are made of a first metal material, and the one or more second lines 424 are made of a second metal material. In some implementations, the second metal material is different from the first metal material. In some implementations, the first metal and/or the second metal have relatively low contact and sheet resistance. In some implementations, the first metal and/or the second metal are flexible. In some implementations, the first metal and/or the second metal include Tantalum Nitride, Titanium, Tungsten, Nickel-Chrome, Aluminum, Gold, and other such metal materials.

Figure 4D:
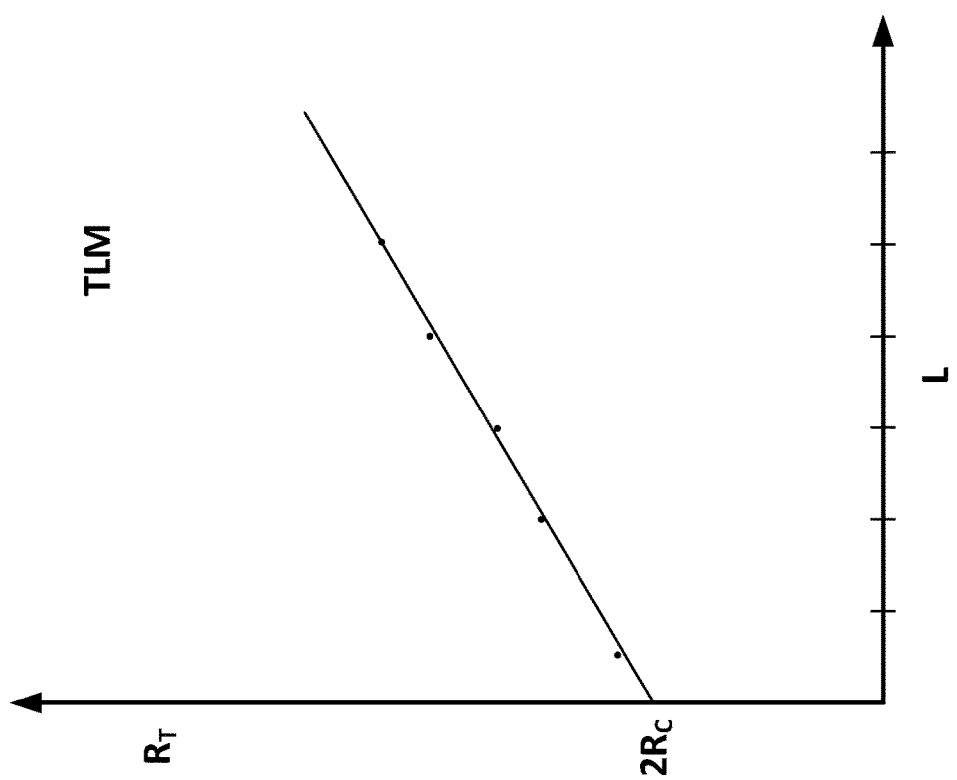
FIG. 4D is a graph of resistance as a function of contact resistance for the example strain gauge layer shown in FIGS. 4A-4C.

In some implementations, the strain gauge layer 400 implements a transmission line method (TLM) design structure to determine a sheet resistance for the strain gauge layer 400, which can be correlated to resistance and/or strain experienced by the foldable glass layer 310. In some implementations, one or more drivers 380 (see FIG. 3B) included, for example, in the sensing device 360, apply a voltage to through pairs of contacts 480, and resistance between each pair of contacts 480 is measured, for example, by the respective resistor probe $Rx_ny_n$. Current flows into the first contact 480 of the pair of contacts 480, across a first junction between the first metal line 422 and the piezoresistive sheet 412, along the piezoresistive sheet 412, across a second junction between the piezoresistive sheet 412 and the second metal line 424 and into the second contact 480 of the pair of contacts 480. In implementing the TLM design structure, resistance is measured by the resistor probe $Rx_ny_n$ for each pair of contacts 480 of the strain gauge layer 400. As these measurements are made between pairs of contacts 480, a measurement of resistance R as a function of a separation between contacts can be generated. The contact separation can be expressed in terms of a ratio of the length L and width W of the base layer 410 between the pair of contacts 480. As shown in FIG. 4D, resistance measurements from each pair of contacts can be used to construct the TLM graph. The slope of the resulting line reflects the total resistance RT, or sheet resistance, or, in this example, the resistance across the strain gauge layer 400. The intercept of the line with the Y-axis is two times the contact resistance $R_C$. Thus, the implementation of the TLM provides for determination of sheet resistance $R_T$ as well as contact resistance $R_C$.

In some implementations, resistance can be measured at each bending cycle, i.e., at each folding and unfolding of the foldable display device 300 including the foldable glass layer 310 and the strain gauge layer 400. The determined resistance is indicative of a level of strain experienced by the foldable glass layer 310 and a condition of the foldable glass layer 310. In some implementations, measurement of resistivity during the bending cycles of the foldable display device 300 in this manner allows the sensing device 360 to measure resistivity at the strain gauge layer 400, and to monitor a condition of the foldable glass layer 310 by detecting strain, and faults such as cracking in the foldable glass layer 310 based on the resistivity measured at the strain gauge layer 400.

In general, strain changes in response to bending, i.e., folding and unfolding of the display device 300/foldable glass layer 310. For example, as the bend radius of the display device 300/foldable glass layer 310 decreases, strain increases. This increase in strain can be measured by the strain gauge layer 400 based on changes in resistance measured in active areas of the strain gauge layer 400. Degradation or faults, for example, in the form of scratches and/or cracks in the foldable glass layer 310 will manifest themselves in a change in resistance/strain measured at the strain gauge layer 400 during a folding/unfolding motion of the foldable display device 300/foldable glass layer 310.

Figure 5:
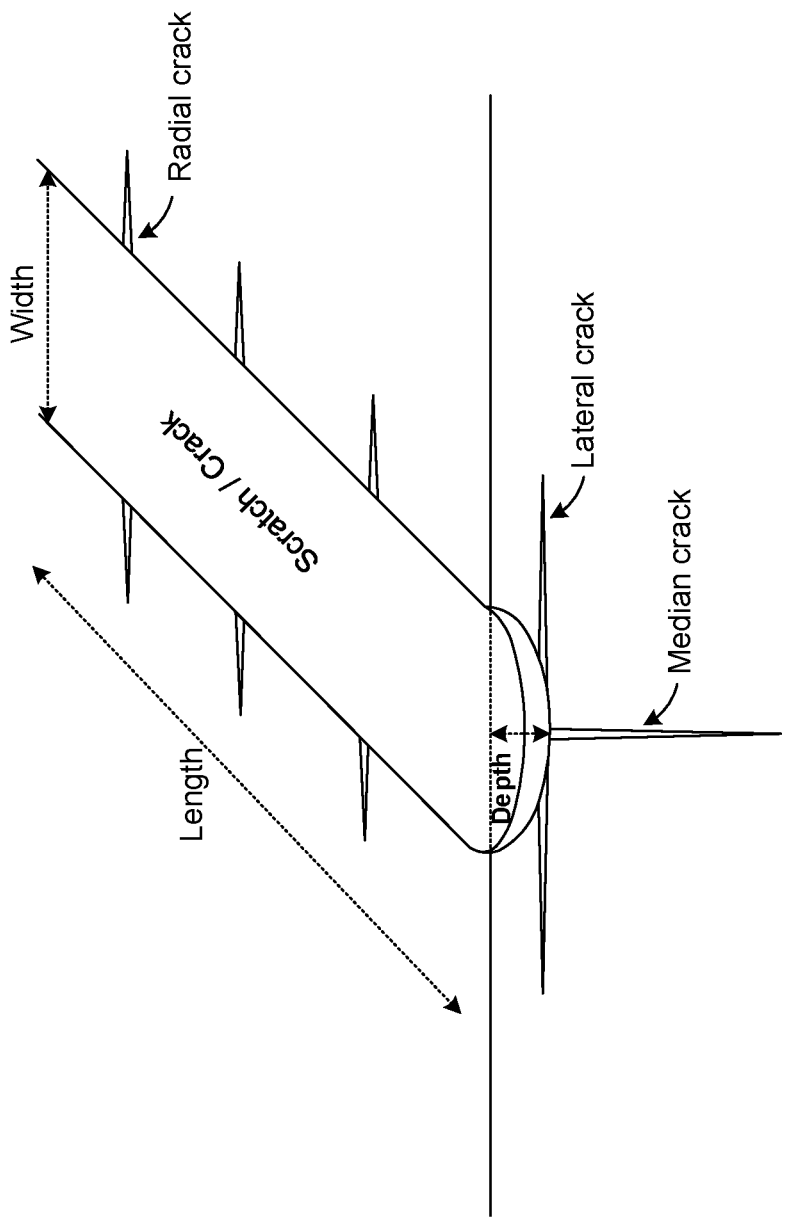
FIG. 5 illustrates an example fault in a surface of a glass layer.

FIG. 5 is a schematic representation of an example scratch or crack that may be experienced in a surface, for example, an outward facing surface, of a glass layer such as, for example, the foldable glass layer 310 described above. The example scratch or crack may be the result of, for example, impact or pocking by an external object, a drop and impact against a hard surface, and the like. The example scratch or crack has a length, a width and a depth that may change (e.g., increase) over time as the foldable glass layer 310 experiences folding/unfolding cycles. In some circumstances, additional cracking may emanate from an initial scratch or crack site, including, for example, radial cracking, lateral cracking, median cracking, and the like. Each of these modes of cracking can cause glass shards to be released as the foldable glass layer 310 experiences folding/unfolding cycles.

Figure 6C:
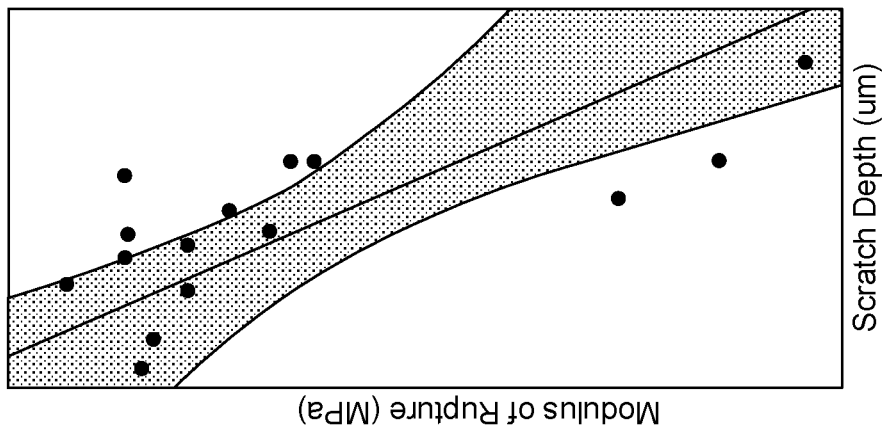
FIGS. 6A, 6B and 6C are graphs of a relationship between scratch length and modulus of rupture, between scratch width and modulus of rupture, and between scratch depth and modulus of rupture of a glass layer.
Figure 6B:
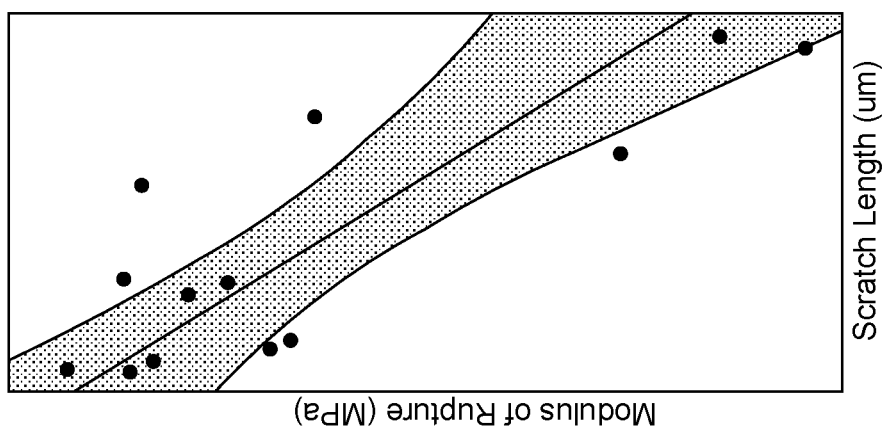
Figure 6A:
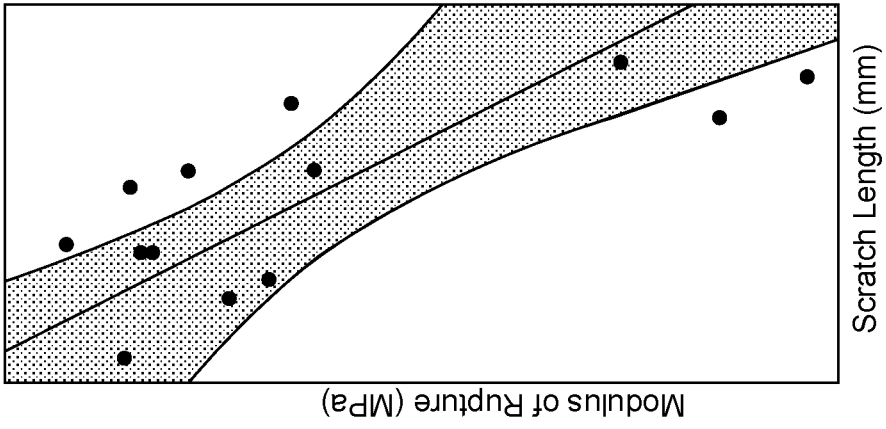

FIG. 6A is a graph illustrating a relationship between scratch length and a modulus of rupture, FIG. 6B is a graph illustrating a relationship between scratch width and a modulus of rupture, and FIG. 6C is a graph illustrating a relationship between scratch depth and a modulus of rupture, in an example glass layer, such as, for example, the foldable glass layer 310 described above. FIGS. 6A and 6B illustrate how the modulus of rupture for the glass layer changes as a function of scratch length, and how modulus of rupture for the foldable glass layer changes as a function of scratch width. In particular, for a given foldable glass layer, much lower force is required to rupture glass that is in some way compromised. As the scratch length increases, the modulus of rupture decreases, and the longer scratch will cause the foldable glass layer to rupture in response to a lower external force. In this situation, the strain gauge layer 400 would measure a corresponding change in resistance level, indicating the presence of the crack. Similarly, as the scratch width increases, the modulus of rupture decreases, and the wider scratch will cause the foldable glass layer to rupture in response to a lower external force, with a corresponding change in resistance level measured by the strain gauge layer 400. In some implementations, resistance level, and changes in resistance level are correlated with crack size and corresponding modulus of rupture for a given glass layer. This allows the measured resistance level, and change in resistance level, to be used to detect the presence of a scratch or crack in the glass layer. In some implementations, a magnitude of the resistance level, or the change in resistance level, can be correlated to a size (i.e., a length and/or a width) of a crack to predict criticality and relative imminence of the crack leading to failure.

Accordingly, in the foldable device 300 including the strain gauge layer 400, in accordance with implementations described herein, a resistance level measured at the strain gauge layer 400 is used to detect a degraded condition of the foldable glass layer 310. The degraded condition includes, for example pocking, scratching, cracking and the like that can result in failure of the foldable glass layer 310 and that can impact the functionality of the foldable device 300. In some implementations, the degraded condition of the foldable glass layer is detected before failure of the foldable glass layer renders the foldable device unusable or inoperable. In some implementations, a detected change in resistance level is correlated with a modulus of rupture for the foldable glass layer 310 to determine criticality, or imminent cracking of the foldable glass layer 310. In some implementations, resistance level is measured at each bending cycle (i.e., at each folding and unfolding cycle) experienced by the foldable device 300/foldable glass layer 310.

Detection of cracking in the foldable glass layer 310 by a system and method, in accordance with implementations described herein, can be influenced by various factors such as, for example, a form factor of the foldable glass layer 310, a composition of the foldable glass layer 310, and other such factors. In some implementations, a system and method, in accordance with implementations described herein, a crack in the foldable glass layer 310 having a length less than approximately 1.0 mm in length is detectable. In some implementations, a crack in the foldable glass layer 310 having a width less than approximately 10 µm is detectable.

In some implementations, a measured resistance $R_m$ that is less than or equal to a previously set threshold resistance $R_0$ is indicative of some form of degradation of the foldable glass layer 310. In some implementations, a measured change in resistance $\Delta R_m$ that is less than or equal to a previously set threshold change in resistance $\Delta R_0$ is indicative of some form of degradation of the foldable glass layer 310. Degradation of the foldable glass layer 310 may include, for example, cracking in the foldable glass layer 310, scratches and/or punctures in the foldable glass layer 310 that could lead to cracking, propagation of existing cracks in the foldable glass layer 310, wear and the like. In some implementations, the set threshold resistance $R_0$ and/or set threshold change in resistance $\Delta R_0$ are indicative of a level of degradation of the foldable glass layer 310 prior to failure of the foldable glass layer 310 that would render the foldable device unusable or inoperable.

As noted above, in some situations, cracking in the foldable glass layer 310 impacts functionality of the foldable display device 300 to the point where the foldable display device 300 is unusable, thus ultimately impacting the functionality of the device in which it is installed (such as, for example, the computing device 200 shown in FIGS. 2A and 2B). That is, cracking of the foldable glass layer 310, particularly in areas of the foldable glass layer 310 that experience bending, can release glass shards, causing damage to the display layer 320, and/or posing a hazard to the user. In some implementations, detection of a triggering condition that is indicative of a fault in the foldable glass layer 310 that will lead to failure is based on the resistance level detected by the strain gauge layer 400. Triggering conditions include, for example, detection that the measured resistance $R_m$ is less than or equal to the previously set threshold resistance $R_0$ and/or detection that the measured change in resistance $\Delta R_m$ that is less than or equal to a previously set threshold change in resistance $\Delta R_0$. In some implementations, in response to one or more of these triggering conditions, the system generates an alert, indicating the detected compromised condition of the foldable glass layer 310. For example, in some implementations, a visual alert is output to the user, for example displayed on the foldable display device 300. In some implementations, an audio alert is output to the user by the computing device 200 in which the foldable display device 300 is installed. In some implementations, other types of alerts are output based on, for example, previously set user preferences, communication with external connected devices, and the like. In some implementations, the alert can include an estimated time frame for replacement of the foldable glass layer 310 to avoid failure of the foldable display device 300.

As noted above, in some implementations, the sensing device 360 includes other types of strain gauge layers. In an implementation in which an alternative strain gauge layer is used, the magnitude of and changes in a different electrical property are used to predict criticality and relative imminence of a crack leading to failure. Such measured electrical properties can be compared to threshold values, substantially as described above, and used to determine triggering conditions and/or to generate alerts.

In some implementations, detection of one or more of the triggering conditions can cause certain functionality of the foldable display device 300/computing device 200 to be temporarily suspended to, for example, preserve the longer term functionality of the foldable display device 300/computing device 200 until the foldable glass layer 310 is replaced. For example, in some implementations, in response to one of the triggering conditions further folding and/or unfolding of the foldable display device 300/computing device 200 may be in some way limited or restricted. This may reduce or substantially eliminate the risk of further propagation of cracks, for example, to a point which could cause irreparable failure of components of the foldable display device 300. This can include, for example, temporarily restricting motion of the hinge mechanism 230 that supports and guides the folding and unfolding motion of the computing device 200, temporarily locking the hinge mechanism 230, and the like. This can include, for example, temporarily suspending overall functionality of the computing device 200 until replacement of the foldable glass layer 310 is detected.

Figure 7A:
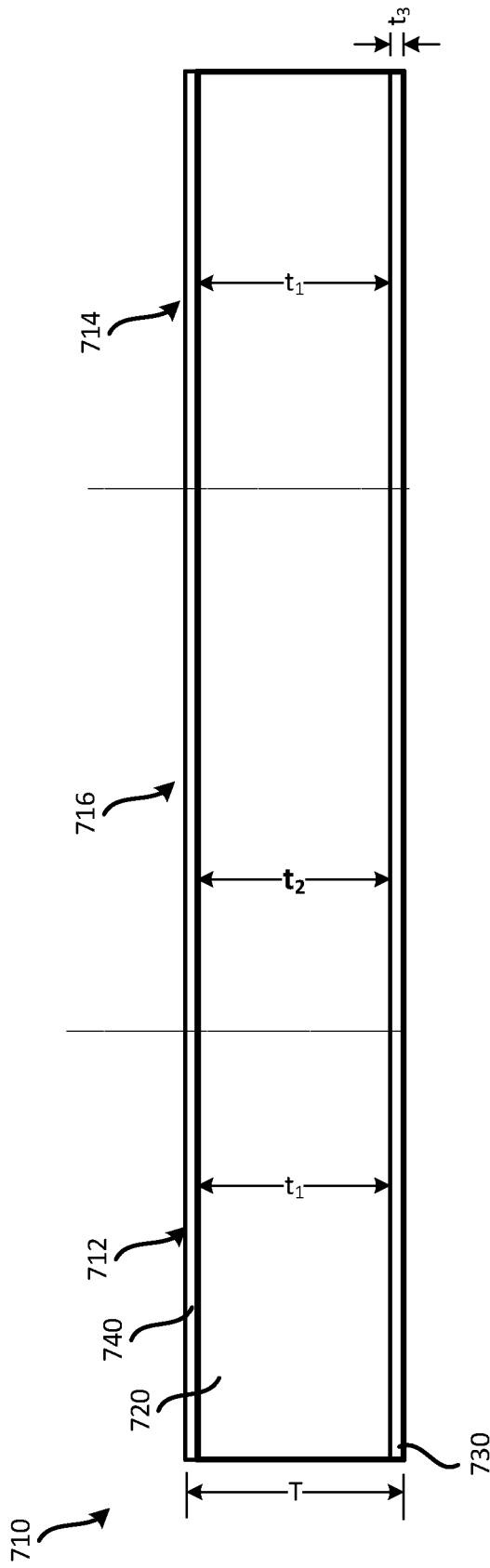
FIGS. 7A and 7B are schematic diagrams of a section of an example foldable glass layer.
Figure 7B:
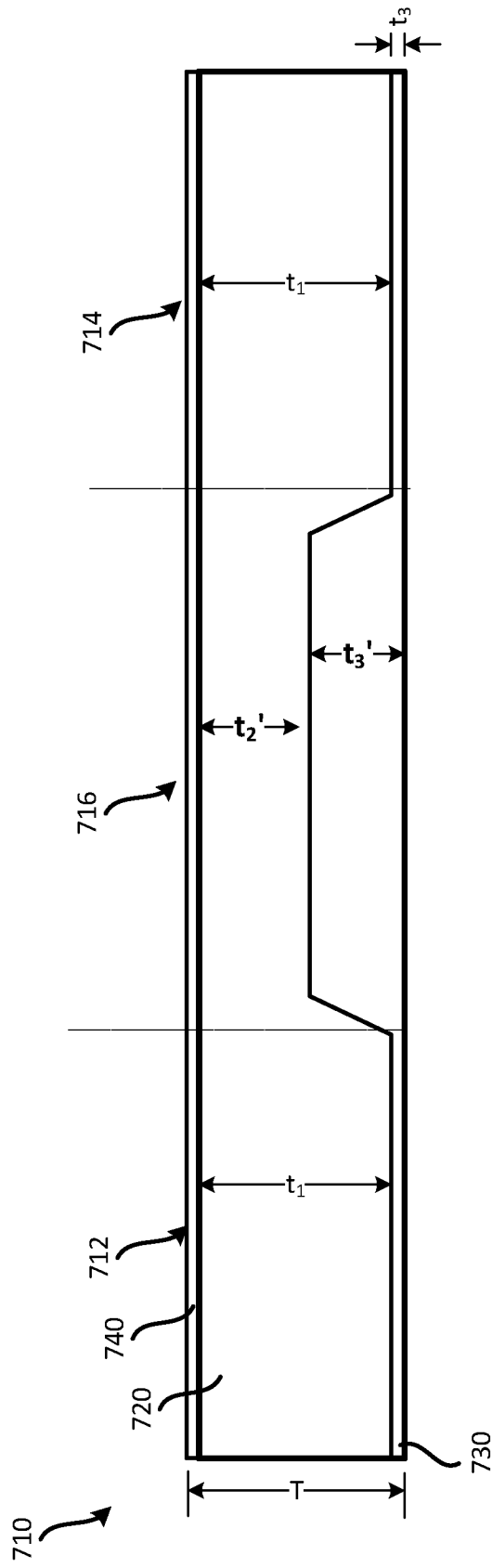

An example foldable glass layer 710 is shown in FIGS. 7A and 7B. The example foldable glass layer 710 includes a glass layer 720 and a first support layer 730. In some implementations, the first support layer 730 is made of a material that provides flexible mechanical support to the glass layer 720 such as, for example, a transparent polymer material. In some implementations, the foldable glass layer 730 includes a second support layer 740 on an outward facing side of the glass layer 720 to provide flexible support to the glass layer 720. The foldable glass layer 710 has a substantially uniform overall thickness T. The foldable glass layer 710 has a first section 716, corresponding to, for example, the bendable section 316 of the foldable display device 300 and/or the bendable section 216 of the foldable computing device 200. The foldable glass layer 710 has a second section 712 and a third section 714 corresponding to, for example, portions of the foldable device 300 shown in FIGS. 3A and 3B and/or the computing device 200 shown in FIGS. 2A and 2B that are not subject to bending or folding (such as, for example, the substantially rigid sections 112, 114 of the example device 100 shown in FIGS. 1A-1D).

As shown in FIG. 7A, in some implementations, a thickness t2 of a portion of the glass layer 720 corresponding to the first section 716 substantially the same as, or equal to, a thickness t1 of a portion of the glass layer 720 corresponding to the second section 712 and/or the third section 714, such that a thickness of the glass layer 720 is substantially uniform along a length of the glass layer 720.

As shown in FIG. 7B, in some implementations, a portion of the glass layer 720 corresponding to the first section 716 is somewhat tapered, such that a thickness t2' of the glass layer 720 at portions corresponding to the first section 716 is less than the thickness t1 of the glass layer 720 at portions corresponding to the second and third sections 712, 714. In this situation, the portion of the support layer 730 corresponding to the first section 716 has a thickness t3' that is greater than a thickness t3 of portions of the support layer 730 corresponding to the second and third sections 712, 714, to maintain the uniform overall thickness T of the foldable glass layer 710. The reduced thickness of the glass layer 720 in the first section 716 (corresponding to the bendable section 316 of the foldable display device 300) may allow for use of a foldable glass layer having an overall greater thickness (when compared to a foldable glass layer that does not include the support layer 730), thus providing a more robust foldable glass layer 720 while still achieving a desired bend radius in the bendable section 716.

FIG. 8 is a flowchart of a method 800 of detecting a condition of a foldable glass layer of a foldable device, in accordance with implementations described herein. In the example method 800 shown in FIG. 8, the condition detection is based on resistance measurements detected by a strain gauge layer of the foldable device. The method 800 will be described with respect to the example foldable device 300 and the example computing device 200 described above, simply for purposes of discussion and illustration. However, the principles described herein are applicable to other types of foldable devices including a foldable glass layer, including devices in which an alternative (e.g. non-resistive) strain gauge layer is used. In such alternative embodiments, triggering conditions are determined on the basis of a magnitude of, or a change in, a measured electrical property (e.g. capacitance, transconductance and the like).

In a foldable device including a foldable glass layer (such as the foldable glass layer 310 described above) and a strain gauge layer (such as the strain gauge layer 400 described above) voltage may be applied to the strain gauge layer 400 (block 810) and a measured resistance $R_m$ is detected (block 820). For example, voltage generated by the driver 380 is applied to contacts 480 of the array of resistors 420 of the strain gauge layer 400, and the measured resistance through the array of resistors 420 is detected. The system determines if one of a plurality of triggering conditions is met (block 830). Detection that one of the plurality of triggering conditions has been met can include, for example, detection that the measured resistance $R_m$ is less than or equal to the previously set threshold resistance $R_0$. Detection that one of the plurality of triggering conditions has been met can include detection that the measured change in resistance $\Delta R_m$ that is less than or equal to a previously set threshold change in resistance $\Delta R_0$. Detection of one of the triggering conditions indicates the presence of a fault in the foldable glass layer 310, and in particular a fault which the system has determined will likely lead to failure of the foldable glass layer 310. In response to detection of the triggering condition, the system outputs an alert (block 840) indicating the presence of a fault (for example, a crack, a scratch or puncture that will propagate to failure and the like). The alert includes, for example, a visual alert, an audio alert, and the like. In some implementations, in response to the detection of the triggering condition, the system disables, for example, temporarily disables, some level of functionality of the computing device 200 (block 850). In some implementations, this may include, for example, limiting or restricting further folding and/or unfolding of the device 200, limiting or restricting overall functionality of the device, and the like until it is detected that the foldable glass layer 310 has been replaced. In some implementations, system action in response to the triggering condition indicative of the fault in the foldable glass layer 310 may be based on previously set user preferences. For example, the output of alerts and/or the alteration of functionality of the device 200 in response to the triggering event indicative of a fault in the foldable glass may be carried out based on previously set user preferences.

The voltage applied (block 810) is an example of an input. Where the strain gauge layer comprises an alternative to resistors, rather than applying a voltage, an appropriate alternative input may be applied. Similar adaptions can be made to the process described with reference to blocks 820 and 830. For example, for operation of a capacitive sensor, an alternating current (AC) waveform can be applied, and a capacitance can be measured, and subsequently compared to a threshold capacitance level. A resistance (or a change in resistance) being less than a threshold is an example of an electrical property (or change in electrical property) meeting a predetermined criterion. In some implementations, alternative criteria area applied (e.g. greater than, within a predetermined range, and the like).

A foldable device having a foldable glass layer and a sensing device including a strain gauge layer, in accordance with implementations described herein, provide for detection of a fault in the foldable glass layer. In some implementations, the fault in the foldable glass layer is detected prior to failure that would otherwise render the foldable device inoperable, so as to maintain and enhance reliability of the foldable device, and maintain and improve user satisfaction.

Figure 9:
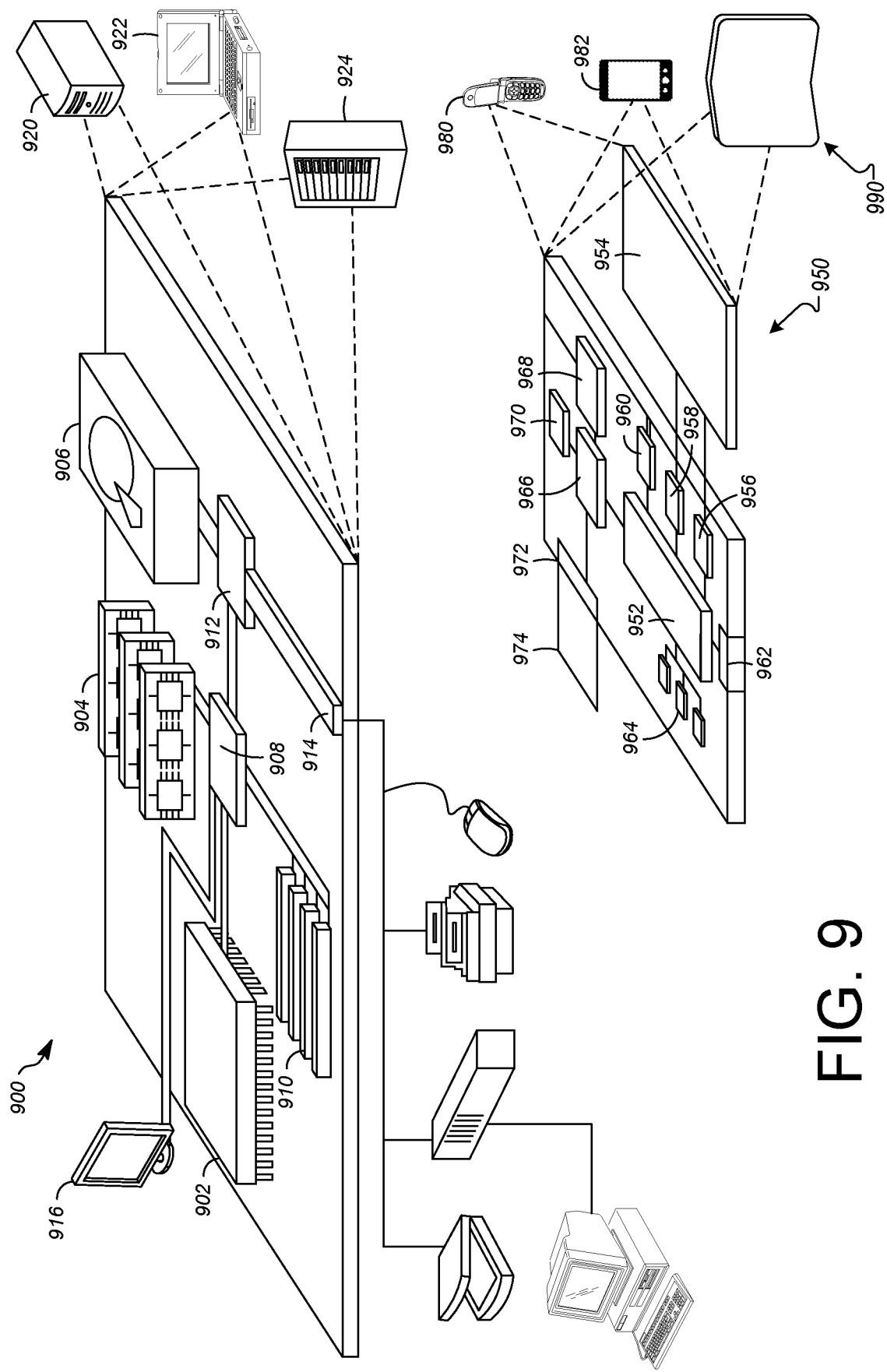
FIG. 9 shows an example of computing devices that can be used to implement the techniques described herein.

FIG. 9 illustrates examples of a computer device 900 and various mobile computer devices 950, 990, which may be used with the techniques described here. The computing device 900 includes a processor 902, memory 904, a storage device 906, a high-speed interface 908 connecting to memory 904 and high-speed expansion ports 910, and a low-speed interface 912 connecting to low-speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low-speed controller 912 manages lower bandwidth-intensive operations. Such allocation of functions is example only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display), and LED (Light Emitting Diode) or an OLED (Organic Light Emitting Diode) display, or other appropriate display technology. The display interface 956 may include appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units.

Expansion memory 974 may also be provided and connected to device 950 through expansion interface 972, which may include, for example, a SIMM (Single In-Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, a computing device 950 may include a touchscreen. For example, a user can interact with the touchscreen to interact with a user interface for a controllable device. For example, the touchscreen may include user interface elements such as sliders that can control properties of the controllable device.

Computing device 900 is intended to represent various forms of digital computers and devices, including, but not limited to laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, be embodied in many alternate forms and should not be construed as limited to only the embodiments set forth herein.

It is understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It is understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, and an, are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A foldable device, including:
   a housing; and
   a foldable display device coupled to the housing, the foldable display device including:
   a foldable display layer having a bendable section;
   a foldable glass layer on a first side of the foldable display layer, the foldable glass layer defining a display surface of the foldable device;
   a sensing device including a strain gauge layer on a second side of the foldable display layer opposite the first side and configured to monitor a condition of the foldable glass layer
   wherein the strain gauge layer includes an array of sensing elements arranged on a substrate, the array of sensing elements being configured to measure an electrical property at the strain gauge layer in response to a detected bending of the foldable device, wherein the sensing device is configured to:
   receive a measured electrical property level measured by the array of resistors of the strain gauge layer; and
   detect a triggering condition based on the measured electrical property level
   detect a fault in the foldable glass layer in response to the detected triggering condition; and
   one or more processors configured to output, at a display of the foldable display device, a graphical alert in response to the detected triggering condition, wherein the graphical alert includes an estimated time frame for replacement of the foldable glass layer to avoid failure of the foldable display device.

2. The foldable device of claim 1, wherein a position of the strain gauge layer on the second side of the foldable display layer corresponds to a position of the bendable section of the foldable display layer.

3. The foldable device of claim 1, wherein the sensing device is configured to:
compare the measured electrical property level to a previously set threshold electrical property level; and
detect the fault in the foldable glass layer in response to a determination that the measured electrical property level is less than or equal to the previously set threshold electrical property level.

4. The foldable device of claim 1, wherein the sensing device is configured to:
compare a currently received measured electrical property level to a previously received measured electrical property level;
calculate a change in measured electrical property level based on the comparison; and
detect the fault in the foldable glass layer in response to a determination that the change in measured electrical property level is less than or equal to a set threshold change in electrical property level.

5. The foldable device of claim 1, wherein the strain gauge layer includes an array of resistors arranged on a piezoresistive substrate, the array of resistors including:
a plurality of first metal lines arranged in a first direction on the substrate;
a plurality of second metal lines arranged in a second direction on the substrate, the second direction being different from the first direction; and
a plurality of contacts on the plurality of first metal lines and the plurality of second metal lines.

6. The foldable device of claim 5, wherein each sensing element of the array of sensing elements extends between a respective contact of the plurality of contacts on one of the plurality of first metal lines and a respective contact of the plurality of contacts on one of the plurality of second metal lines.

7. The foldable device of claim 1, wherein the array of sensing elements comprises an array of resistors arranged on a piezoresistive substrate, the array of resistors being arranged to measure resistance at the strain gauge layer.

8. The foldable device of claim 1, wherein the strain gauge layer includes a capacitive strain gauge or a thin film transistor based strain gauge.

9. A method of detecting a fault in a foldable glass layer of a foldable display device, the method comprising:
applying, by a driver of the foldable display device, an input to an array of sensing elements arranged on a substrate of a strain gauge layer included in a sensing device positioned on a first side of a display layer of the foldable display device;
measuring, by the array of sensing elements, an electrical property level, wherein the measuring, by the array of sensing elements, the electrical property level includes measuring the electrical property level during a bending cycle of the foldable display device, the strain gauge layer being located at a position corresponding to a bendable section of the foldable display device;
detecting, by the sensing device, a fault in the foldable glass layer based on the measured electrical property level, the foldable glass layer being positioned on a second side of the display layer opposite the first side, wherein the detecting, by the sensing device, the fault in the foldable glass layer includes:
receiving the measured electrical property level measured by the array of resistors of the strain gauge layer;
detecting a triggering condition based on the measured electrical property level; and
detecting a fault in the foldable glass layer in response to the detected triggering condition; and
outputting, at a display of the foldable display device, a graphical alert in response to the detected triggering condition, wherein outputting the graphical alert comprised outputting the graphical alert with an estimated time frame for replacement of the foldable glass layer to avoid failure of the foldable display device.

* * * * *